United States Patent
Pankaj et al.

(10) Patent No.: US 9,529,936 B1
(45) Date of Patent: Dec. 27, 2016

(54) SEARCH RESULTS USING QUERY HINTS

(71) Applicant: A9.com, Inc., Palo Alto, CA (US)

(72) Inventors: Balpreet Singh Pankaj, Santa Clara, CA (US); Hernan Epelman, Redwood City, CA (US); Vyacheslav Leizerovich, San Jose, CA (US); Michael Yang, San Francisco, CA (US)

(73) Assignee: A9.com, Inc., Palo Alto, CA (US)

( * ) Notice: Subject to any disclaimer, the term of this patent is extended or adjusted under 35 U.S.C. 154(b) by 175 days.

(21) Appl. No.: 14/227,897

(22) Filed: Mar. 27, 2014

(51) Int. Cl.
*G06F 17/30* (2006.01)
(52) U.S. Cl.
CPC ................. *G06F 17/3097* (2013.01)
(58) Field of Classification Search
CPC combination set(s) only.
See application file for complete search history.

(56) References Cited

U.S. PATENT DOCUMENTS

| | | | |
|---|---|---|---|
| 2001/0054035 A1* | 12/2001 | Lee | G06F 17/30864 |
| 2010/0030465 A1* | 2/2010 | Solkesz | G01C 21/20 |
| | | | 701/533 |
| 2011/0040777 A1* | 2/2011 | Stefanov | G06F 17/30864 |
| | | | 707/767 |
| 2011/0093488 A1* | 4/2011 | Amacker | G06F 17/30873 |
| | | | 707/767 |

* cited by examiner

*Primary Examiner* — Etienne Leroux
(74) *Attorney, Agent, or Firm* — Hogan Lovells US LLP

(57) ABSTRACT

Systems and methods are provided that allow a user to send a search query and a hint associated with the search query to a search system. Suggested queries are associated with hints prior to the suggested queries being provided to a user interface that allows a user to enter search information into a search field. After receiving input into the search field, the input is sent to a search system and suggested queries with their associated hints are returned. In response to selecting a suggested query, the suggested query and the associated hint are returned to the search service. The search service then provides search results based on the suggested query and the associated hint.

15 Claims, 6 Drawing Sheets

SEARCH RESULTS USING QUERY HINTS

BACKGROUND

Search engines typically receive a search query from a user and provide search results that are responsive to that query. For example, if a user entered the word "Boston" into a search engine, the search engine may provide a listing of search results that include resources that relate to Boston Mass., Boston Electronics, Boston Book Stores, etc.

Some search engines provide a query suggestions feature to provide a user with a listing of one or more suggested queries that relate to the user's initial query. The listing of suggested queries can be provided, for example, in a drop-down list. For example, as the user begins typing a query into a search interface, a drop-down list can be displayed with the suggested queries that correspond to the text inputted by the user. For example, if the user typed in "m" and "o", the suggested queries may include "Montana," "Mom's Diner," "Mortgage calculator," etc. The user can then select one of the suggested complete queries to obtain search results that are responsive to the suggested query or the user can continue inputting their desired query to obtain search results responsive to the desired query. When a suggested query is selected, the terms in the suggested query, e.g., "Mom's" and "Diner," will typically be sent back to the search system. The search system will then provide a listing of search results that reference resources matching the terms "Mom's" and "Diner." However, providing the best results based solely on query terms may not be optimal because additional context is provided by the selection of a suggested query, both implicit and explicit.

BRIEF DESCRIPTION OF THE DRAWINGS

Various embodiments in accordance with the present disclosure will be described with reference to the drawings, in which.

DETAILED DESCRIPTION

Figure 1:
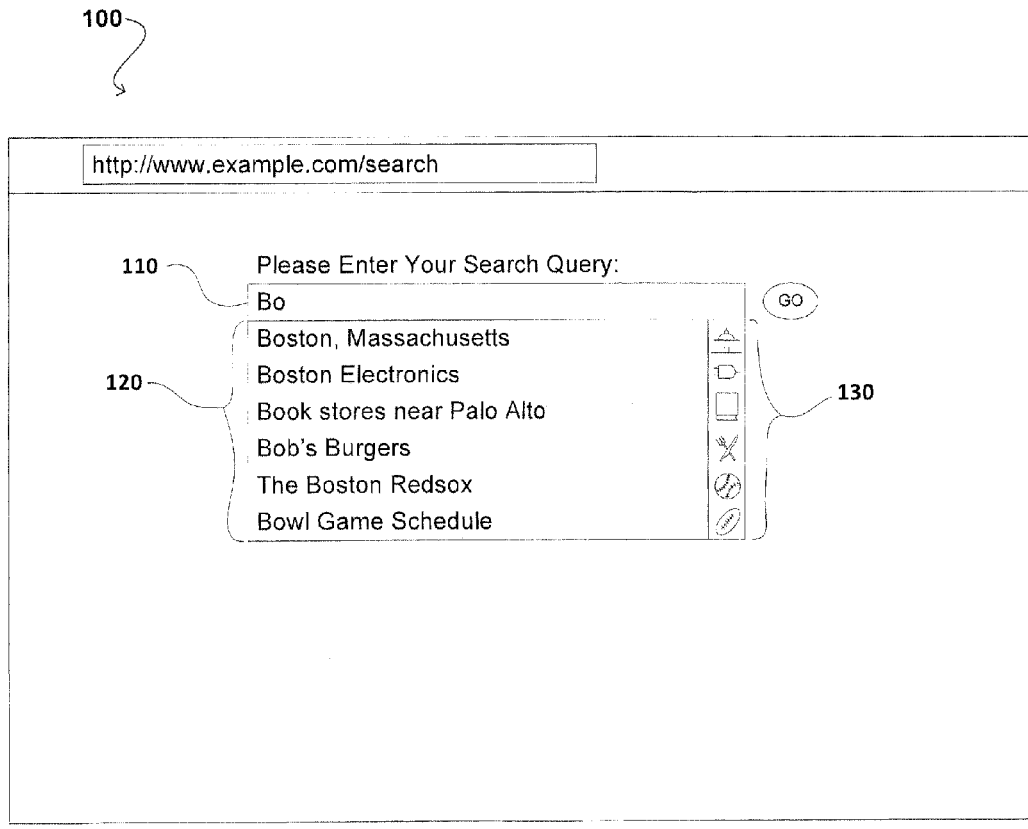
FIG. 1 illustrates an example interface displaying a listing of suggested queries that have been associated with respective hints.

Systems and methods in accordance with various embodiments of the present disclosure may overcome one or more of the aforementioned and other deficiencies experienced in conventional approaches to search. In particular, various embodiments describe a search system that is configured to provide a listing of suggested search queries in response to user input received as part of an initial search query. The search system can associate suggested search queries with one or more hints, e.g., metadata, that describe attributes about the suggested search query. For example, a suggested search query "Bob's Burgers" can be associated with a hint that references a "restaurant" category.

A user can interact with the search system through a search interface by inputting a search query, e.g., "bo." In response, the search system can obtain one or more suggested search queries based at least in part on the user input. The listing of suggested search queries can be presented on the search interface. The user can select one of the suggested search queries to obtain search results that are responsive to the suggested search query. Naturally, the listing of suggested queries can be updated when the user continues to input additional text in the search interface.

Typically, in conventional search systems, when the user selects a query from the listing of suggested search queries, the terms in the selected query, e.g., "Bob's" and "burgers," are sent to the search system. Once the terms are received, the search system obtains a listing of search results that are responsive to the terms, e.g., "Bob's" and "burgers." Users can then sort through the listing of search results that may be tangentially related to the terms in the selected query.

One way to provide a user with relevant search results that are more in line with the user's intent is to associate suggested queries with one or more hints that each describe an attribute of the suggested query. For example, in response to a user entering a query term "Alcatraz," the search system can obtain suggested queries "Alcatraz island ferry schedule" and "Alcatraz memorabilia." In this example, the suggested query "Alcatraz island ferry schedule" may be associated with a hint specifying a "transportation" category while the suggested query "Alcatraz memorabilia" may be associated with a hint specifying a "shopping" category. If the user selects the query "Alcatraz island ferry schedule," it is unlikely that the user is searching for information related to "Alcatraz memorabilia." Thus, when obtaining search results for the suggested query "Alcatraz island ferry schedule," the search system is configured to identify search results that are responsive to the query "Alcatraz island ferry schedule" and that are associated with the "transportation" category. Additionally, in some embodiments, a search need not be performed at all. For example, in some embodiments the hint may be sufficient to cause results to be delivered without a search. If one of the suggested queries is "Alcatraz Map," then the hint may direct a user directly to a map of Alcatraz rather than provide a user with search results. Similarly, if there is only one Alcatraz Coffee Shop located on Alcatraz island, if a user selects the suggested query "Alcatraz Coffee Shop" their browser may be directed directly to the homepage for the Alcatraz Coffee Shop. In other words, in some embodiments, the hint may circumvent the search such that the entered text is irrelevant to the search system.

FIG. 1 illustrates an interface 100, e.g., a web browser, that is running on a computing device and is accessing a search interface, e.g., a web site, of a search system. As shown in FIG. 1, the user is interacting with the search interface to input a portion of a search query "Bo" 110. In response, the search system has provided a listing of suggested queries 120 that includes the suggested queries "Boston, Mass.," "Boston Electronics," "Book stores near Palo Alto," "Bob's Burgers," "The Boston Redsox," and "Bowl Game Schedule." It should be appreciated that in some embodiments described herein, suggested queries may include queries that do not necessarily start with the prefix entered in the search interface. For example, although "Bo" was entered into the search interface in FIG. 1, "The Boston Redsox" is provided as a suggested query.

Each of these suggested queries 120 can be associated with one or more respective hints. As briefly discussed above, hints can be used to provide semantic context to a search query. In some embodiments, hints may be used by the search system to narrow a set of search results to provide the user with more precise search results. For example, a hint associated with a suggested query can specify a category that relates to the suggested query. When the user selects this suggested query, the search system can obtain a listing of search results that are responsive to the suggested query. In particular, search results included in this listing can be selected based on the category that was associated with the suggested query.

For example, for a query "Sea," one suggested query may be "Seattle, Wash." and that suggested query can be associated with a hint referencing a category for the city of Seattle. If a user selects the suggested query "Seattle, Wash." the search system can obtain resources that are associated with the city of Seattle, and not simply resources that include the words "Seattle" and "WA." Categories can be narrow or broad. For example, a hint may indicate that the search query is related to a point of interest. A point of interest may be a landmark, a place of business, a school, etc. Similarly, a hint may indicate a product or a category of products. Similarly, hints may indicate that a search query is related to a city, entity, company, author, film, artist, album, etc. It should also be appreciated that a hint may be based at least in part on a geographic location associated with a computing device.

In a different example, a suggested query "Chinese takeout" can be associated with a hint that specifies a category "Chinese restaurant." When a user selects the suggested query "Chinese takeout," the search system would typically search in a corpus of resources using the terms "Chinese" and "takeout." However, in various embodiments described herein, the search system is configured to identify, based on the associated hint, that the suggested query "Chinese takeout" corresponds to a category "Chinese restaurant." Based on the hint, when obtaining search results responsive to the suggested query "Chinese takeout," the search system will search resources that have been categorized as "Chinese restaurant" instead of obtaining search results from a generally uncategorized corpus of resources.

Thus, in various embodiments described herein, search results may be influenced by hints. That is, rather than obtaining search results from a general corpus of resources, in some embodiments, hints are used to obtain resources responsive to a search query from a corpus of resources that are related to at least one particular hint.

In FIG. 1, the suggested search query "Boston Mass." is associated with a hint that references a "city" category, the suggested search query "Boston Electronics" is associated with a hint that references an "electronic stores" category, the suggested search query "Book stores near Palo Alto" is associated with a hint that references a "book stores" category (or in some embodiments, multiple hints that reference at least "book stores" and "Palo Alto"), the suggested search query "Bob's Burgers" is associated with a hint that references a "restaurants" category, the suggested search query "The Boston Redsox" is associated with a hint that references a specific entity in the "baseball" category, and the suggested search query "Bowl Game Schedule" is associated with a hint that references a "sports events" category. In any event, a hint may be received from a search system with the suggested search query. Once received, a client may store a hint on its own device or browser (e.g., as a favorite, based on browser history, etc.). In addition, as shown in FIG. 1, in some embodiments a respective hint indicator, e.g., icon 130, can be presented along with the list of suggested queries to visually indicate that a suggested query is associated with one or more hints. Similarly, a suggested query may be highlighted (e.g., bolded, rendered in a particular color) in order to visually indicate that a suggested query is associated with one or more hints. For example, the word "Boston" may be bolded in the suggested query "Boston Electronics." This may indicate to a user that the search will return electronic stores in or around Boston. Similarly, if the word Electronics were bolded as opposed to Boston, a search may return electronic stores that sell the same type of electronics as Boston Electronics.

When a user selects a suggested query, the selected query and its corresponding hint are sent to the search service. The search service then obtains a set of search results based at least in part on the suggested query and the hint, and provides a listing of the search results for display. It should be appreciated that a hint may assist with search results even if a hint does not find a perfect match. For example, a user may search for "New York Pizza Palo Alto." While the hints associated with this search example may be Pizza and/or Palo Alto, the user is not searching for pizza in New York. Thus, the hint Palo Alto may be used to identify a geographic region, and as a response to the search for "New York Pizza Palo Alto," pizza stores that serve New York style pizza in a nearby city (or other geolocation) may appear in a search result set.

Moreover, not every suggested query is necessarily associated with a hint. In some embodiments, if a user simply types a query into a search field without selecting a suggested query, the search system will process the query normally. In some embodiments, if the query entered by the user matches a query that the search system has associated with a hint, then the search system will process the entered query based on the associated hint.

Figure 2:
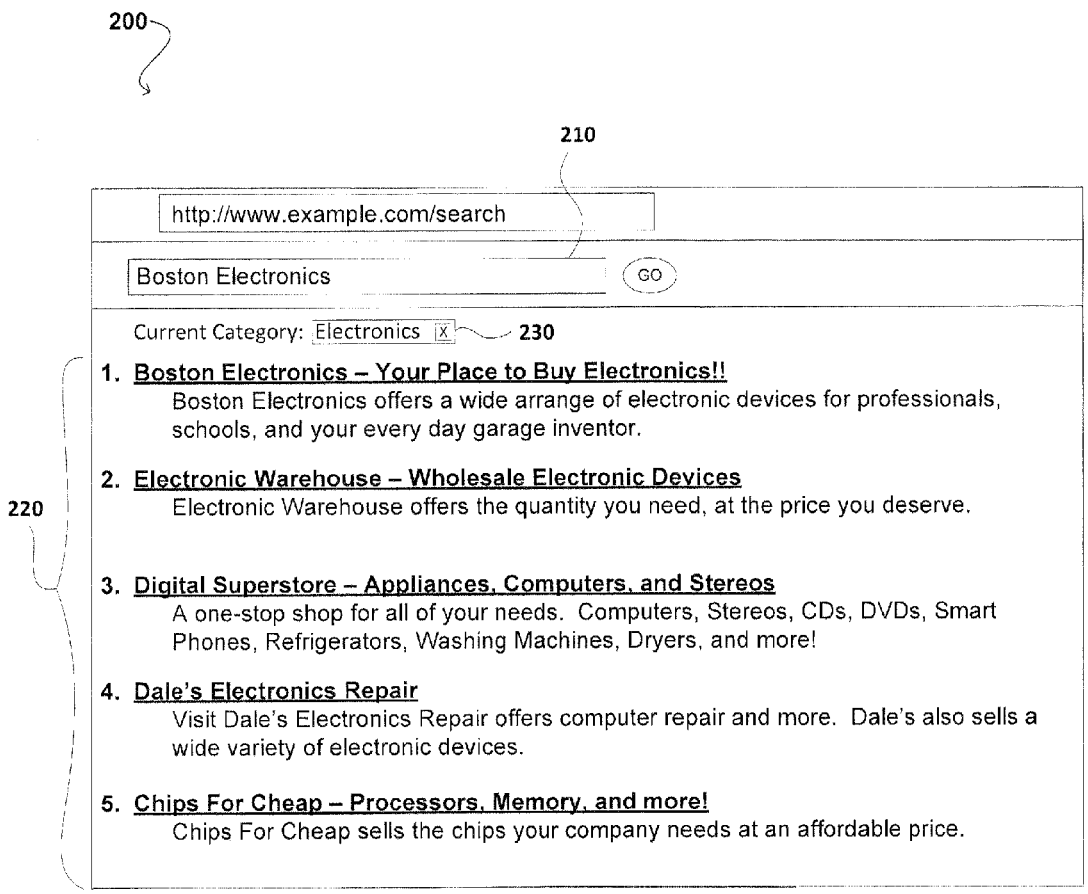
FIG. 2 illustrates an example interface presenting a listing of search results responsive to a selection of a suggested query.

FIG. 2 illustrates an example user interface 200 presenting a listing of search results responsive to a selection of a suggested query. In FIG. 2, the example listing of search results 220 are presented in response to a user having selected the suggested query "Boston Electronics" that was associated with a hint referencing an "electronic supply stores" category, as described in reference to FIG. 1. The hint associated with the query "Boston Electronics" causes the search system to provide a listing of search results that reference resources associated with other electronic supply stores. As a result, the hint can be used to prevent the search system from returning results associated with electronic museums in Boston, Mass., for example.

In some embodiments, an example user interface 200 may include a hint indicator 230. A hint indicator 230 may provide a user with context regarding the search results. For example, the hint indicator 230 shown an example user interface 200 indicates that the search results are narrowed by the term electronics. If a user desired to search for electronic stores in Boston, the user may search again, or un-filter the search results by manipulating a widget associated with the hint indicator 230 (e.g., clicking on an "X" button).

Figure 3:
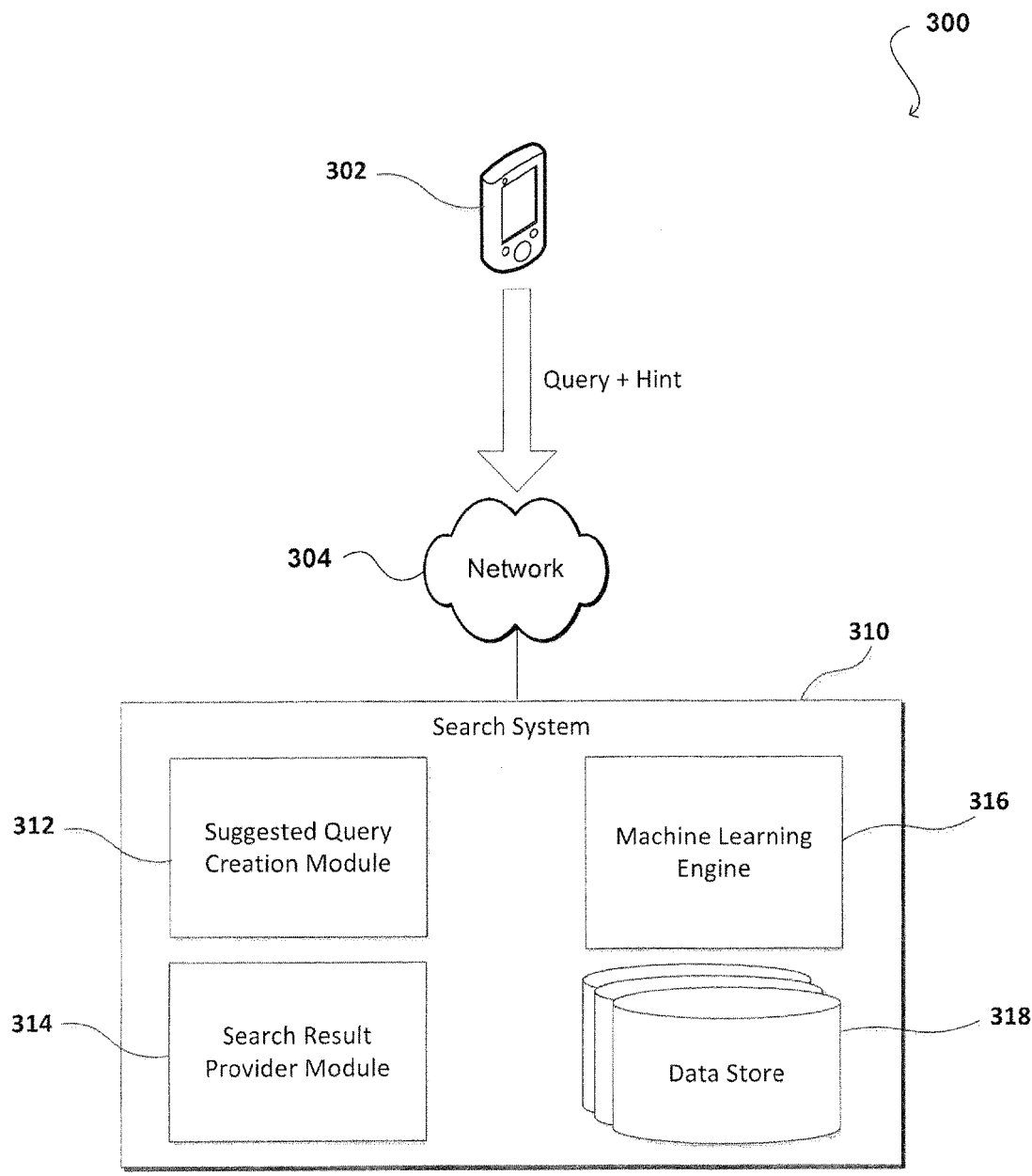
FIG. 3 illustrates an example environment in which aspects of various embodiments can be performed.

FIG. 3 illustrates an example environment 300 in which aspects of various embodiments can be performed. The environment 300 includes a computing device 302 coupled to a network 304. The computing device 302 can be any type of device capable of displaying a search interface in accordance with embodiments described herein. For example, computing device 302 may be a smart phone, a laptop computer, a desktop computer, a tablet computer, a wearable computer, etc. The computing device is operable to interact with a search system 310 through the network 304. In some examples, the computing device is operable to receive voice input operable to interact with a search system 310 (regardless of whether the voice input is decoded on the computing device or within the search system).

The search system 310 is also coupled to the network 304. In some embodiments, search system 310 includes a suggested query creation module 312, a search result provider module 314, a machine learning engine 316, and one or more data stores 318. The suggested query creation module 312 is configured to associate suggested queries with one or more hints. In some embodiments, hints may be created by the suggested query creation module 312 offline while a suggested query database is built. The suggested query creation module may base hints at least in part on past user behavior, the sources used to gather queries, etc. As discussed herein, in various embodiments, hints associated with suggested queries are sent to a user's computing device along with the suggested query. For example, the suggested query "Chinese restaurants" can be sent to a computing device along with a hint indicating that the suggested query is related to Asian restaurants. When a user selects the suggested query, the computing device can send the suggested query and the hint back to the search system 310. The search system 310 can use terms in the suggested query and the associated hint to identify responsive resources.

Thus, the hint may be stored on the computing device 302 for at least some period of time. In various embodiments, the hint may be stored and/or sent as a JavaScript Object Notation (JSON) block, e.g., a 64base encoded JSON block. Of course, the hint may be stored in a variety of data structures which could be sent to the search service as well.

In some embodiments, the machine learning engine 316 is configured to refine searches based on previous searches. When many users perform a different search, or return to the previous search screen, after receiving a particular list of search results, the machine learning engine may modify provided search results (in some cases in conjunction with the search result provider module). For example, a particular number of users may select the suggested query Chinese restaurants, which is associated with a hint that causes Thai and Japanese restaurants to be returned. If an amount of users over a particular threshold then perform a different search associated with Chinese restaurants, then the search system 310 may modify provided search results such that only Chinese restaurants are shown when a user selects the suggested query Chinese restaurants. In some embodiments, the machine learning engine may operate offline, or at a time other than when a user is entering a query. By implementing machine learning offline the computing device and the search system save resources to be used during the search itself. Thus, increasingly complicated machine learning algorithms may be applied since timing is not an issue.

In some embodiments a data store may include items near a particular location. As with the embodiments described above, a suggested query may be determined prior to any terms being entered into a search field. In some embodiments, in response to the term near being part of a suggested query, the suggested query creation module may create one or more suggested queries based on items in a data store related to locations. For example the term "near" could be associated with the city of Seattle, Stanford, or a sports stadium.

In some embodiments more than one term in a suggested query may be used to determine a hint. One term in a suggested query may cause the suggested query creation module to search for another term. To continue with the example above, if a suggested query includes the word near, the search system may also associate locations or objects with the particular suggested query. For example, suggested query module may associate a city and a coffee shop or Chinese restaurant with the terms near and Seattle. As such, when a user selects the suggested query coffee shops near Seattle, the hint will narrow the users search to coffee shops near Seattle.

In some embodiments, suggested queries may be modified when additional information is entered into a search field. For example, if the terms "Coffee" and "Shops" are entered into a search field, suggested results related to Coffee Shops may be provided in a drop-down list. If additional terms are entered into a search field, such as the term near, then another set of suggested results may related to "Coffee Shops near" may be provided, or the same results may be provided but in a different order. While the first suggested results may include Coffee Shops, the second set of suggested results may include Coffee Shops near Seattle, or Coffee Shops near Palo Alto, for example. In some embodiments, one hint may be provided with suggestions for the words "Coffee Shops," and any other hint provided must be associated data store used to create the hint associated with the words "Coffee Shops." For example, if a user began typing "restaurants," at least one suggested query is associated with a hint that would narrow the search results to restaurants. If a user continues to type the letter "S," then additional suggestions may be provided that are based at least in part upon the first hint. For example, restaurants in Seattle or restaurants near sixth street may be provided as suggested queries. In some embodiments, where locations are associated with hints, a map may be displayed. For instance, maps may be displayed when in response to a cursor hovering over a particular suggested query. Similarly, a map may be displayed at the same time suggested queries are displayed.

In some embodiments, hints indicate that a group of objects are related. For example, while being created hints may group objects that have similar attributes. A hint may determine that a group of restaurants within a predetermined area are part of a restaurant chain. In such an example, if a user enters "coffee shops near me," the hint that is sent back to the computing device, and then back to the search system may indicate that a portion of the coffee shops near the location of the computing device are part of a chain. In this embodiment, a listing of search results indicate which coffee shops are part of a chain. In addition, the search results may list other coffee shops which are part of that chain, but may not necessarily be within a predetermined distance from the location of the computing device.

Figure 4:
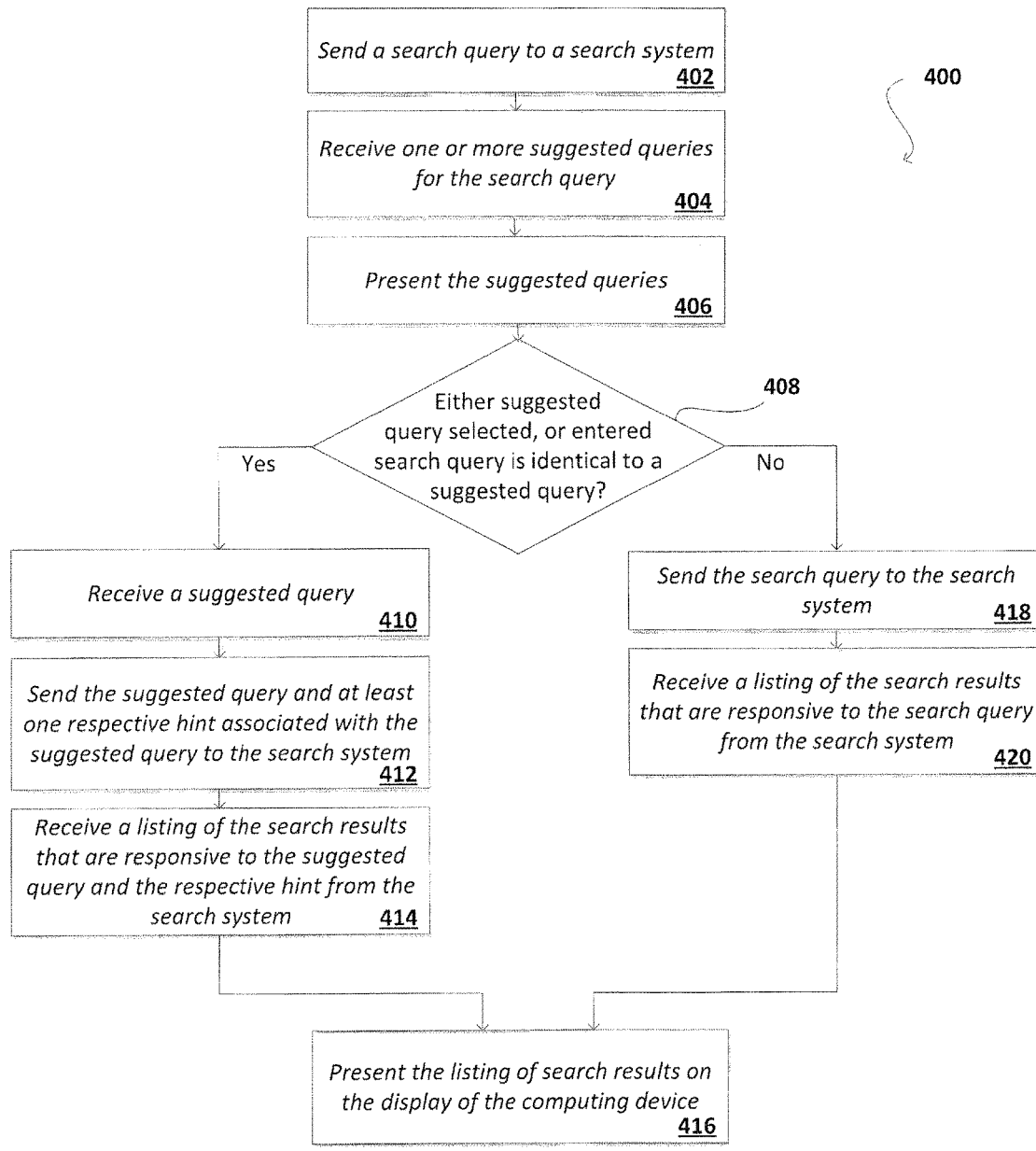
FIG. 4 illustrates an example method for presenting a list of search results, accordance with various embodiments.

FIG. 4 illustrates an example method 400 for presenting a listing of search results on the display of a computing device. It should be understood that there can be additional, fewer, or alternative steps performed in similar or alternative orders, or in parallel, within the scope of the various embodiments unless otherwise stated. The example method 400 can start with sending a search query to a search system 402. In response, the search system may provide a listing of one or more suggested queries that relate to the submitted search query 404. Some of these suggested queries may be associated with respective hints, as described above. After the suggested queries are received, the suggested queries can be presented on a display screen of the computing device, as described above 406. For example, these suggested queries may be in the form of a drop-down menu.

A user may select a suggested query or may submit an entered search query 408. If a suggested query is received 410, the suggested query and at least one hint associated with the suggested query is sent to the search system 412. It should be appreciated that in some embodiments described herein, a user may submit a search query to the search system that is identical to a suggested search query. For example, a drop down menu of suggested queries may show "Boston Electronics," and rather than selecting the suggested query from a drop down menu, a user may simply enter "Boston Electronics" into a search interface and click on a search button. In various embodiments described herein, a search system may respond in the same manner as if a suggested query were selected from a drop down menu. Thus, if it is determined that a user searched for a string of text that is identical to the text of a suggested query at decision element 408, the entered search query may be associated with a respective hint and treated as though it were a suggested query at steps 410 and 412.

In some embodiments, hints may be stored or created on a client computing device. For example, a hint may be stored in a browser (e.g., as a favorite query or in the history of a browser). Thus, in some embodiments, a user may simply select a favorite query (or data associated therewith), and a hint and a query corresponding to the favorite will be received as a suggested query in step 410. Of course, past search history may cause various suggested queries in a drop down menu in various embodiments.

In response to receiving a suggested query and a respective hint, a listing of search results that are responsive to the suggested query and the at least one hint is received 414. The listing of search results can then be presented 416 on the display of the computing device.

It should be understood that the user may still enter text into a search field and search without selecting a suggested query associated with a hint. In such instances, the user does not select a suggested query and instead submits an entered search query 418. In response, a listing of search results that are responsive to the suggested query and the at least one hint is received 414. The listing of search results can then be presented 416 on the display of the computing device.

Figure 5:
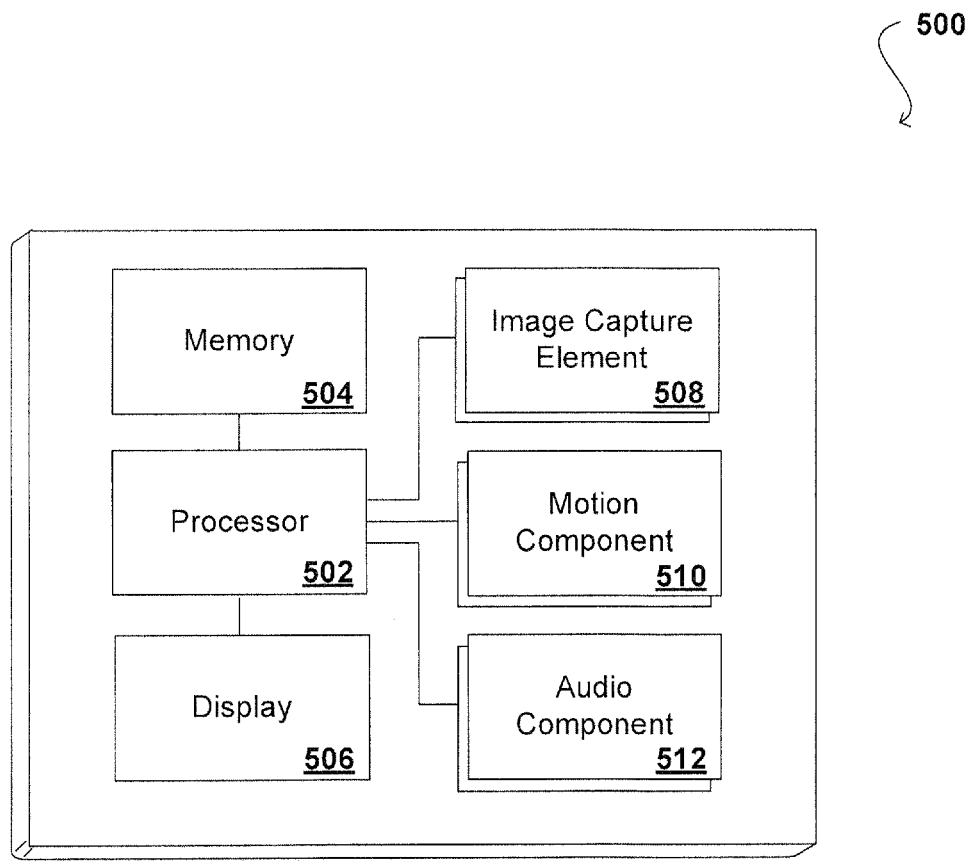
FIG. 5 illustrates example components of a computing device, in which various embodiments can be implemented.

FIG. 5 illustrates a logical arrangement of a set of general components of an example computing device 500 such as the device 302 described with respect to FIG. 3. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one image capture element 508 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 512, such as a mono or stereo microphone or microphone array, operable to capture audio information from at least one primary direction. A microphone can be a uni-directional or omni-directional microphone as known for such devices.

In some embodiments, the computing device 500 of FIG. 5 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 500 also can include at least one orientation or motion sensor 510. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 502, whereby the device can perform any of a number of actions described or suggested herein.

As an example, a computing device such as that described with respect to FIG. 3 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. Moreover, a hint may be based at least in part upon this information. As discussed above, the information can be stored in such a way that the information is linked or otherwise associated whereby a user can access the information using any appropriate dimension or group of dimensions.

Figure 6:
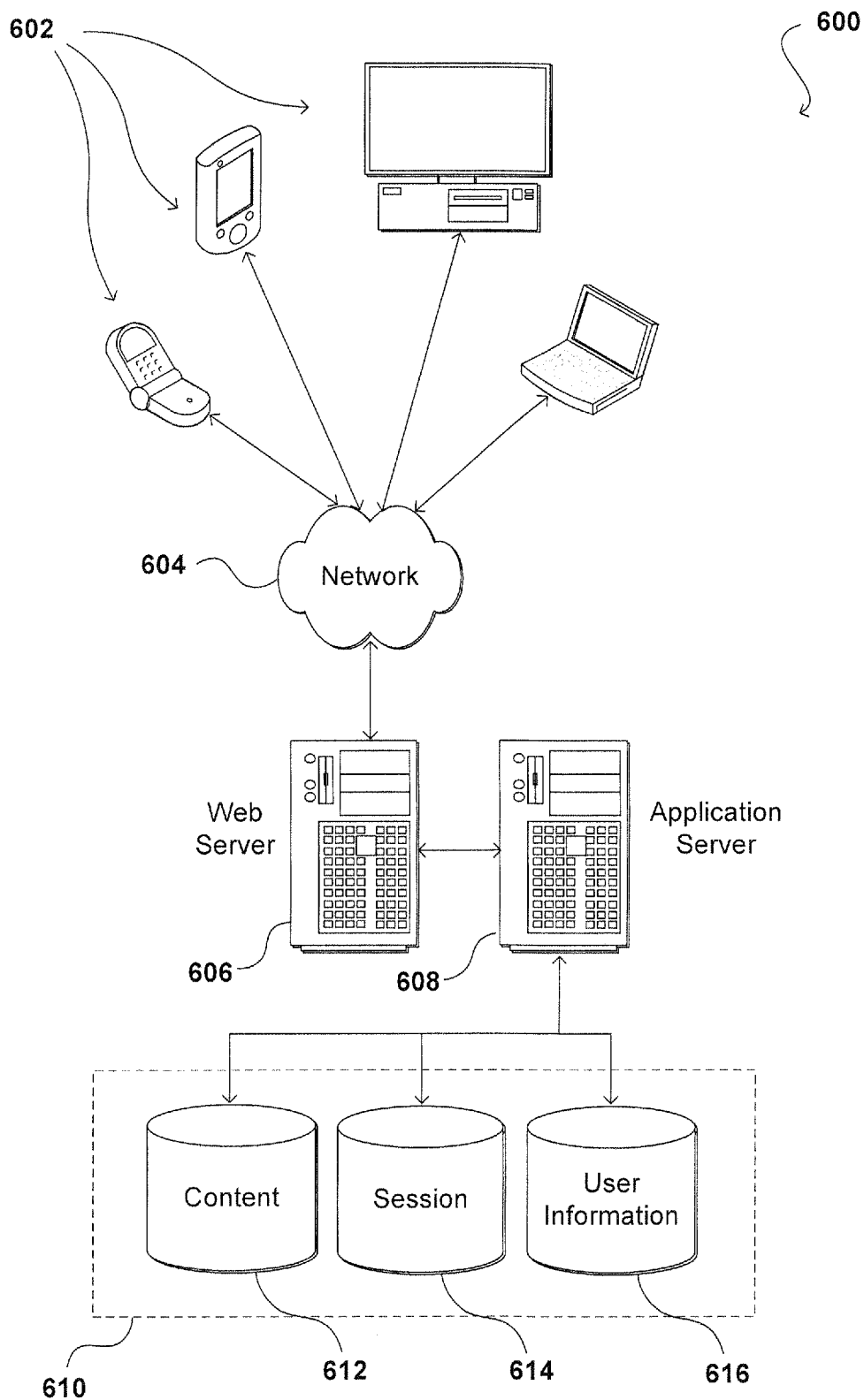
FIG. 6 illustrates an example environment in which various embodiments can be implemented.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 602. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks. Most embodiments utilize at least one network that would be familiar to those skilled in the art for supporting communications using any of a variety of comercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
   at least one processor;
   a display screen; and
   memory including instructions that, when executed by the at least one processor, cause the computing device to perform a set of operations comprising:
      sending a search query to a search system;
      receiving, from the search system, a plurality of suggested queries for the search query, wherein a first suggested query is associated with a first category and a second suggested query is associated with a second category;
      receiving, from the search system, a first icon associated with the first category for the first suggested query and a second icon associated with the second category for the second suggested query;
      presenting, on a display screen of the computing device, the plurality of suggested queries, including the first suggested query and the first icon and the second suggested query and the second icon;
      receiving a user selection of the first suggested query;
      sending, to the search system, the first suggested query and the first category, wherein the search system is configured to generate a listing of search results that reference respective resources that are associated with the first suggested query and the first category;
      receiving, from the search system, the listing of search results that is responsive to the first suggested query and the first category; and
      presenting the listing of search results on the display screen of the computing device.

2. The computing device of claim 1, wherein the first category further associates the suggested query with a particular service, a service category, a particular product, a product category, a city, a point of interest, an organization, or a franchise.

3. The computing device of claim 1, wherein search results in the listing of search results reference respective resources that are associated with the first category.

4. A computer-implemented method, comprising:
   receiving a portion of a search query from a user device;
   obtaining a listing of a plurality of suggested queries that correspond to the portion of the search query, wherein a first suggested query is associated with a first category and a second suggested query is associated with a second category;
   providing, with the listing of the plurality of suggested queries, a first icon associated with the first category for the first suggested query and a second icon associated with the second category for the second suggested query;

presenting, on a display screen of the user device, the listing of the plurality of suggested queries, including the first suggested query and the first icon and the second suggested query and the second icon;

receiving the first suggested query from the user device and data describing the first category of the first query;

identifying one or more resources responsive to the first suggested query and that have previously been associated with the first category of the first suggested query; and providing a listing of search results that reference the one or more identified resources, each resource being associated with the first suggested query and the first category of the first suggested query.

5. The computer-implemented method of claim 4, further comprising:

associating each resource in a general corpus of resources with at least one respective category-specific corpus of resources that corresponds to at least one category associated with the resource.

6. The computer-implemented method of claim 5, wherein the at least one respective category-specific corpus of resources corresponds to a particular service, a service category, a particular product, a product category, a city, a point of interest, an organization, or a franchise.

7. The computer-implemented method of claim 4, wherein identifying one or more resources responsive to the first suggested query and that have previously been associated with the first category of the first suggested query further comprises:

identifying, based on the first category, at least one category-specific corpus of resources; and identifying, from the at least one category-specific corpus of resources, one or more resources responsive to the first suggested query.

8. The computer-implemented method of claim 4, wherein the first category associates the first suggested query with a particular service, a service category, a particular product, a product category, a city, a point of interest, an organization, a franchise, an author, an artist, an album, a film, or a company.

9. The computer-implemented method of claim 4, wherein receiving the first suggested query from the user device and data describing first category includes:

receiving a selection of the first suggested query.

10. The computer-implemented method of claim 4, wherein receiving the first suggested query from the user device and data describing the first category includes:

receiving text that is identical to the first suggested query.

11. A computing device comprising:
at least one processor;
a display screen; and
memory including instructions that, when executed by the at least one processor, cause the computing device to perform a set of operations comprising:

receiving, through a search interface, user input representing a portion of a search query;

sending the portion of the search query to a search system;

receiving, from the search system, a plurality of suggested queries that relate to the portion of the search query, wherein a first suggested query is associated with a first category and a second suggested query is associated with a second category;

receiving, from the search system, a first icon associated with the first category for the first suggested query and a second icon associated with the second category for the second suggested query;

presenting, on the display screen of the computing device, the plurality of suggested queries, including the first suggested query and the first icon and the second suggested query and the second icon;

receiving a user selection of the first suggested query;

sending the selected first suggested query to the search system;

receiving at least one search result that is responsive to the selected first suggested query and the first category; and presenting the at least one search result.

12. The computing device of claim 11, wherein sending the selected first suggested query to the search system further comprises:

sending, to the search system, the first suggested query and the first category.

13. The computing device of claim 11, wherein the first category further associates the first suggested query with a particular service, a service category, a particular product, a product category, a city, a point of interest, an organization, or a franchise.

14. The computing device of claim 11, wherein the category is an encoded JavaScript Object Notation (JSON) block.

15. The computing device of claim 11, receiving a user selection of the first suggested query further comprises:

receiving an input selecting the first suggested query or receiving text that is identical to the first suggested query.

* * * * *